(12) United States Patent
Takahashi et al.

(10) Patent No.: US 12,092,401 B2
(45) Date of Patent: Sep. 17, 2024

(54) DIFFUSION BONDING HEAT EXCHANGER

(71) Applicant: Sumitomo Precision Products Co., Ltd., Amagasaki (JP)

(72) Inventors: Suguru Takahashi, Amagasaki (JP); Yasuhiro Fujita, Amagasaki (JP)

(73) Assignee: Sumitomo Precision Products Co., Ltd, Amagasaki (JP)

( * ) Notice: Subject to any disclaimer, the term of this patent is extended or adjusted under 35 U.S.C. 154(b) by 505 days.

(21) Appl. No.: 17/295,928

(22) PCT Filed: Nov. 20, 2019

(86) PCT No.: PCT/JP2019/045353
§ 371 (c)(1),
(2) Date: May 21, 2021

(87) PCT Pub. No.: WO2020/105658
PCT Pub. Date: May 28, 2020

(65) Prior Publication Data
US 2022/0011053 A1    Jan. 13, 2022

(30) Foreign Application Priority Data
Nov. 22, 2018  (JP) .................................. 2018-219165

(51) Int. Cl.
*F28F 9/26*     (2006.01)
*F28D 9/00*     (2006.01)

(52) U.S. Cl.
CPC .............. *F28D 9/0093* (2013.01); *F28F 9/26* (2013.01); *F28F 2275/061* (2013.01)

(58) Field of Classification Search
CPC .......... F28F 2225/04; F28F 3/04; F28F 3/048; F28F 2275/061; F28D 9/0062
See application file for complete search history.

(56) References Cited

U.S. PATENT DOCUMENTS

| 5,392,849  | A  | 2/1995 | Matsunaga et al. |
| 10,365,045 | B2 | 7/2019 | Choi |

(Continued)

FOREIGN PATENT DOCUMENTS

| JP | 4-161796 A   | 6/1992 |
| JP | 2008-39255 A | 2/2008 |

(Continued)

OTHER PUBLICATIONS

International Search Report (PCT/ISA/210) issued in PCT Application No. PCT/JP2019/045353 dated Jan. 7, 2020 with English translation (four (4) pages).

(Continued)

*Primary Examiner* — Travis Ruby
(74) *Attorney, Agent, or Firm* — Crowell & Moring LLP

(57) ABSTRACT

An object of the present invention is to provide a diffusion bonding heat exchanger with which it is possible to reduce a thermal stress that is generated due to heat exchange between fluids significantly different from each other in temperature even in a case where the number of stacked heat transfer plates is made large. A diffusion bonding heat exchanger (100) includes a core (1) in which a plurality of heat transfer plates (HP) are stacked and diffusion-bonded to each other. The core includes a plurality of flow path blocks (40) each of which is configured to include a plurality of flow path layers (30) and a partition wall layer (50) that divides the plurality of flow path blocks. A thickness (t3) of the partition wall layer in a stacking direction is larger than an interval (t2) between flow paths arranged in the stacking direction.

19 Claims, 7 Drawing Sheets

(56) References Cited

U.S. PATENT DOCUMENTS

| | | |
|---|---|---|
| 2015/0316326 A1 | 11/2015 | Choi |
| 2016/0209129 A1 | 7/2016 | Dietrich et al. |
| 2017/0268826 A1 | 9/2017 | Noishiki et al. |
| 2019/0285352 A1 | 9/2019 | Choi |

FOREIGN PATENT DOCUMENTS

| | | |
|---|---|---|
| JP | 2016-535233 A | 11/2016 |
| JP | 2017-146092 A | 8/2017 |
| JP | 2017-166775 A | 9/2017 |
| JP | 2018-141602 A | 9/2018 |
| KR | 10-1376531 B1 | 3/2014 |
| KR | 10-2018-0098341 A | 9/2018 |
| WO | WO 2017/115723 A1 | 7/2017 |

OTHER PUBLICATIONS

Japanese-language Written Opinion (PCT/ISA/237) issued in PCT Application No. PCT/JP2019/045353 dated Jan. 7, 2020 (five (5) pages).

DIFFUSION BONDING HEAT EXCHANGER

TECHNICAL FIELD

The present invention relates to a diffusion bonding heat exchanger, particularly, to a diffusion bonding heat exchanger having a configuration in which a plurality of heat transfer plates are stacked and diffusion-bonded to each other.

BACKGROUND ART

As a heat exchanger in the related art, a plate type heat exchanger is known. Such a heat exchanger is disclosed in Japanese Unexamined Patent Application Publication (Translation of PCT Application) No. 2016-535233.

Japanese Unexamined Patent Application Publication (Translation of PCT Application) No. 2016-535233 as above discloses a plate type heat exchanger that includes a plurality of heat exchanger blocks including a plurality of heat exchange paths configured by brazing thin separation plates, sidebars, and fins and in which the heat exchanger blocks are connected to each other via solder at cover plates facing each other. Japanese Unexamined Patent Application Publication (Translation of PCT Application) No. 2016-535233 discloses connecting the cover plates of the heat exchanger blocks, which face each other, to each other over the entire surfaces thereof via a solder-clad thin metal plate.

In a heat exchanger as described in Japanese Unexamined Patent Application Publication (Translation of PCT Application) No. 2016-535233, when the temperature difference between the fluid on the high temperature side and the fluid on the low temperature side is large, a large thermal stress is generated in the constituent members of the heat exchanger. Since the mechanical strength obtained through soldering is not so high, a fatigue fracture may occur in a case where a large thermal stress is generated. Note that, a thermal stress is a stress that is generated inside an object when thermal deformation (expansion or contraction) of the object caused by a change in temperature is hindered due to external restriction.

CITATION LIST

Patent Literature

[PTL 1] Japanese Unexamined Patent Application Publication (Translation of PCT Application) No. 2016-535233

SUMMARY OF INVENTION

Technical Problem

In this regard, as a heat exchanger that can also be used in applications where a temperature difference between the temperatures of fluids is large (thermal stress is large), a diffusion bonding heat exchanger in which heat transfer plates are diffusion-bonded to each other is known. The diffusion bonding heat exchanger has a high rigidity since the heat transfer plates formed of metal are integrated with each other by being diffusion-bonded to each other and the diffusion bonding heat exchanger is used for heat exchange between a very low-temperature fluid such as liquid hydrogen and a liquefied natural gas and water or antifreeze (brine) as a high-temperature fluid in some cases.

However, even in the diffusion bonding heat exchanger which generally has a high rigidity, in a case where the number of stacked heat transfer plates is made large to ensure the area of heat transfer or the like, a large thermal stress due to an increase in magnitude of thermal deformation (thermal expansion or thermal contraction) of a metal part is generated, which causes a fatigue fracture. Therefore, it is desired that a thermal stress that is generated due to heat exchange between fluids significantly different from each other in temperature is reduced in the diffusion bonding heat exchanger even in a case where the number of stacked heat transfer plates is made large to ensure the area of heat transfer.

The invention has been made to solve problems as described above and an object of the invention is to provide a diffusion bonding heat exchanger with which it is possible to reduce a thermal stress generated due to heat exchange between fluids significantly different from each other in temperature even in a case where the number of stacked heat transfer plates is made large.

Solution to Problem

In order to achieve the above-described object, the invention provides a diffusion bonding heat exchanger including a core in which a plurality of heat transfer plates are stacked and diffusion-bonded to each other. The core includes a plurality of flow path blocks each of which is configured to include a plurality of flow path layers in which flow paths are formed and a partition wall layer that is disposed to divide the plurality of flow path blocks and a thickness of the partition wall layer in a stacking direction is larger than an interval between the flow paths arranged in the stacking direction. In the present specification, the "flow path layers" and the "partition wall layer" are portions of the core and are regions composed of at least one of the plurality of heat transfer plates that are stacked and diffusion-bonded to each other and configured as layers having a flat plate shape reflecting the shape of each heat transfer plate and extending in a direction orthogonal to the stacking direction. The "flow path layers" are layers each of which has a thickness that coincides with the height dimension of the flow paths in the stacking direction.

In the diffusion bonding heat exchanger according to the invention, as described above, the partition wall layer is disposed to divide the plurality of flow path blocks each of which is configured to include the plurality of flow path layers and the thickness of the partition wall layer in the stacking direction is larger than the interval between the flow paths arranged in the stacking direction. Accordingly, even in a case where the total number of the flow path layers is increased with an increase in number of stacked heat transfer plates to ensure the area of heat transfer, the flow path layers can be divided by the partition wall layer into the plurality of flow path blocks with a smaller number of stacked layers. In addition, since the partition wall layer has the thickness that is larger than the interval between the flow paths arranged in the stacking direction, the partition wall layer can ensure a high rigidity in comparison with a case where the flow path layers are simply stacked. Therefore, in the partition wall layer, thermal deformation (thermal expansion or thermal contraction) caused by a temperature difference between fluids can be made smaller than that of the flow path layers. As a result, in the entire core, the partition wall layer between the flow path blocks functions as a supporting structure suppressing deformation of the flow path blocks and thus even when each of the plurality of the flow path blocks arranged in the stacking direction is thermally deformed, the influence of the thermal deformation on adjacent flow path blocks can be suppressed. Since the magnitude of thermal deformation is proportional to the length of a deformed portion, the amount of thermal deformation in each of the flow path blocks divided by the partition wall layer such that the number of stacked layers in each flow path block is smaller than the total number of the flow path layers can be reduced and thus it is possible to achieve a decrease in thermal stress corresponding thereto. As a result, even when the number of stacked heat transfer plates is increased, a thermal stress generated due to heat exchange between fluids significantly different from each other in temperature can be reduced.

In the diffusion bonding heat exchanger according to the invention, in a cross-section orthogonal to the flow paths, a proportion of a solid portion in the partition wall layer is preferably larger than a proportion of a solid portion in the flow path layer. Note that, in this specification, "solid" means being filled with a constituent material. According to such a configuration, it is possible to make the rigidity of the partition wall layer higher than that of each of the flow path layers constituting the flow path blocks easily and thus thermal deformation between the flow path blocks can be effectively suppressed.

In the diffusion bonding heat exchanger according to the invention, the partition wall layer preferably includes a solid portion that is continuous in a direction along the flow path layers in a cross-section orthogonal to the flow paths from one end to the other end of an area in which the flow paths of the flow path layers are formed. According to such a configuration, it is possible to form a supporting structure that supports the area, in which the flow paths are formed, from the one end to the other end thereof in a region of the partition wall layer between the flow path blocks by means of the solid portion of the partition wall layer. For example, in a case where a very low-temperature fluid flows through the flow paths in the flow path blocks and the flow path blocks are contracted and deformed, in the partition wall layer, it is possible to provide a support against contraction deformation in a direction along the flow path layers with the solid portion. Accordingly, the amount of thermal deformation of the flow path blocks can be reduced and the thermal stress can be effectively reduced.

In the diffusion bonding heat exchanger according to the invention, the flow path layers are preferably composed of first heat transfer plates which are the heat transfer plates in which groove portions constituting the flow paths are formed by diffusion bonding and the partition wall layer is preferably composed of a second heat transfer plate which is the heat transfer plate in which no groove portion is formed. According to such a configuration, the flow path layers and the partition wall layer can be formed by using heat transfer plates (plate members) having the same specifications. That is, when the core is formed, groove portion forming processing is performed on a plurality of prepared heat transfer plates to form the first heat transfer plates and the remainder of the heat transfer plates in which no groove portion is formed can be used as the second heat transfer plate as it is. Therefore, it is possible to reduce the number of the types of components constituting the core in comparison with a case where the first heat transfer plates and the second heat transfer plate are formed by using heat transfer plates (plate members) having different specifications from each other and thus it is possible to easily manufacture a heat exchanger even in a case where the partition wall layer is to be provided in the core.

In this case, the partition wall layer is preferably composed of a plurality of the second heat transfer plates that are stacked. According to such a configuration, even in a case where the first heat transfer plates and the second heat transfer plates are formed by using heat transfer plates (plate members) having the same specifications, it is possible to ensure the thickness of the partition wall layer by stacking the second heat transfer plates. In addition, the thickness of the partition wall layer can be easily adjusted by means of the number of stacked second heat transfer plates.

In the diffusion bonding heat exchanger according to the invention, the flow path layers are preferably composed of a first heat transfer plate in which groove portions constituting the flow paths are formed by diffusion bonding and a third heat transfer plate in which the groove portions are formed and that has a larger thickness than the first heat transfer plate and the partition wall layer is preferably composed of a portion of the third heat transfer plate excluding the groove portions. According to such a configuration, it is possible to collectively configure the flow path layer that is disposed at an outermost portion in the stacking direction from among the flow path layers constituting the flow path block and the partition wall layer adjacent to the outermost flow path layer by means of the third heat transfer plate. That is, for example, in a case where a flow path block including N flow path layers is to be configured, N flow path blocks and the partition wall layer can be configured by stacking (N−1) first heat transfer plates and one third heat transfer plate.

In the diffusion bonding heat exchanger according to the invention, a thickness of the partition wall layer in the stacking direction is preferably larger than a pitch of the flow path layers constituting the flow path blocks. Here, the "pitch of the flow path layers" is a formation interval between the flow path layers in the flow path blocks and is a distance between the same portions of the flow path layers adjacent to each other in the stacking direction. According to such a configuration, it is possible to provide the partition wall layer of which the thickness is larger than the pitch of the flow path layers and it is possible to ensure the rigidity of the partition wall layer. Accordingly, it is possible to effectively suppress thermal deformation (thermal expansion or thermal contraction) of the flow path blocks and a thermal stress caused by the thermal deformation.

In the diffusion bonding heat exchanger according to the invention, the flow path layers constituting the flow path blocks and the partition wall layer are preferably formed of the same material and are preferably diffusion-bonded to each other without using a bonding material. According to such a configuration, the linear expansion coefficients of the flow path layers and the partition wall layer formed of the same material coincide with each other and thus generation of a stress caused by a difference between the amounts of thermal deformation at a joint portion can be reduced. In addition, in the diffusion bonding, materials on surfaces to be bonded are integrated with each other in units of atoms. Therefore, the flow path layers and the partition wall layer can be firmly bonded to each other in comparison with a case where the flow path layers and the partition wall layer are bonded to each other with a bonding material such as solder interposed therebetween. As a result, it is possible to prevent fatigue fracture or the like of the joint portion caused by thermal deformation. In addition, in a case where the layers constituting the flow path blocks are bonded to each other by using a bonding material such as solder, defects in solder-joint portions between the layers are generated due to the influence of heat at a time when header portions are welded to side surfaces of the core and thus leakage of a fluid becomes likely to occur between the flow path blocks. However, according to the above-described configuration, the layers constituting the flow path blocks are more firmly bonded to each other. Therefore, such a defect is less likely to occur even if there is an influence of heat when the header portions are welded and thus leakage of the fluids between the flow path blocks can be suppressed.

Advantageous Effects of Invention

According to the present invention, as described above, it is possible to provide a diffusion bonding heat exchanger with which it is possible to reduce a thermal stress that is generated due to heat exchange between fluids significantly different from each other in temperature even in a case where the number of stacked heat transfer plates is made large.

DESCRIPTION OF EMBODIMENTS

Hereinafter, embodiments of the present invention will be described with reference to the drawings.

First Embodiment

With reference to FIGS. 1 to 6, the configuration of a heat exchanger 100 according to a first embodiment will be described. The heat exchanger 100 according to the first embodiment is a diffusion bonding plate type heat exchanger configured by stacking heat transfer plates formed of metal and integrating the heat transfer plates with each other through diffusion bonding. The heat exchanger 100 is an example of a "diffusion bonding heat exchanger" in claims.

Figure 1:
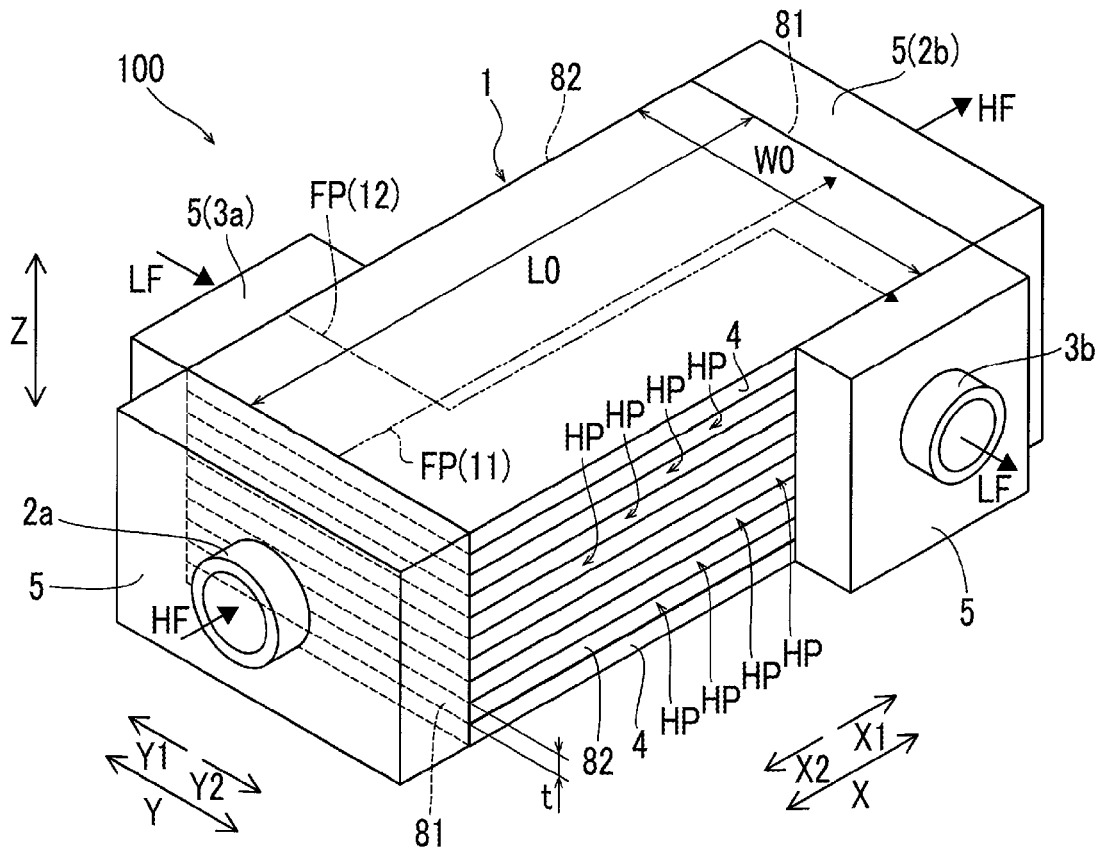
FIG. 1 is a schematic perspective view showing a heat exchanger according to a first embodiment.

As shown in FIG. 1, the heat exchanger 100 includes a core 1 at which a plurality of heat transfer plates HP are stacked and diffusion-bonded to each other. In addition, the heat exchanger 100 includes a first inlet 2a, a first outlet 2b (refer to FIG. 3), a second inlet 3a (refer to FIG. 4), and a second outlet 3b. The core 1 includes a plurality of flow paths FP configured by means of the stacked heat transfer plates HP. The plurality of flow paths FP include at least a plurality of first flow paths 11 through which a high-temperature fluid HF flows and a plurality of second flow paths 12 (refer to FIG. 4) through which a low-temperature fluid LF flows. The core 1 is a heat exchange section at which heat exchange is performed between the high-temperature fluid HF flowing through the first flow paths 11 and the low-temperature fluid LF flowing through the second flow paths 12.

The first inlet 2a and the first outlet 2b are an inlet for introducing the high-temperature fluid HF into the first flow paths 11 and an outlet for leading out the high-temperature fluid HF from the first flow paths 11 and are provided at an inlet side and an outlet side while forming a pair. The second inlet 3a and the second outlet 3b are an inlet for introducing the low-temperature fluid LF into the second flow paths 12 and an outlet for leading out the low-temperature fluid LF from the second flow paths 12 and are provided at an inlet side and an outlet side while forming a pair.

The heat exchanger 100 in the first embodiment is configured as a heat exchanger that recovers cold of the low-temperature fluid LF to the high-temperature fluid HF side through heat exchange between the high-temperature fluid HF and the low-temperature fluid LF. Note that, the high-temperature fluid HF and the low-temperature fluid LF are a fluid on a relatively-high-temperature side and a fluid on a relatively-low-temperature side at the time of heat exchange and are not fluids of specific temperatures. That is, the low-temperature fluid LF is a fluid of which the temperature is lower than that of the high-temperature fluid HF and the high-temperature fluid HF is a fluid of which the temperature is higher than that of the low-temperature fluid LF. In the first embodiment, the low-temperature fluid LF is a very low-temperature liquid and is, for example, liquefied hydrogen. Examples of the high-temperature fluid HF include liquid such as antifreeze (brine).

Although there is no particular limitation, each of the heat transfer plates HP constituting the core 1 as shown in FIG. 1 has a flat quadrangular (rectangular) plate-like shape. The heat transfer plates HP are stacked in a thickness direction. Accordingly, the core 1 has a rectangular parallelepiped shape. Hereinafter, for the sake of convenience, a stacking direction of the heat transfer plates HP in the core 1 will be referred to as a direction Z and two directions (directions extending along surfaces of heat transfer plates) that are orthogonal to the stacking direction and are orthogonal to each other will be referred to as a direction X and a direction Y, respectively. Note that, the direction X and the direction Y are a direction along a long side of the core 1 (heat transfer plates HP) and a direction along a short side of the core 1 in a plane orthogonal to the stacking direction.

Each of the heat transfer plates HP includes a pair of first side end surfaces 81 and a pair of second side end surfaces 82 adjacent to the first side end surfaces 81. The first side end surfaces 81 are side end surfaces close to short sides and the second side end surfaces 82 are side end surfaces close to long sides. Regarding the heat transfer plates HP, the second side end surfaces 82 have a length (length of core 1) L0 and the first side end surfaces 81 have a length (width of core 1) W0. All of the heat transfer plates HP have approximately the same thickness t. The plurality of heat transfer plates HP may include a plurality of types of heat transfer plates different from each other in thickness t. The heat transfer plates HP are formed of, for example, stainless steel. The heat transfer plates HP may be formed of metal other than stainless steel such as aluminum-based metal and copper-based metal as long as the heat transfer plates HP can be diffusion-bonded to each other.

A side plate 4 is provided at each of opposite ends of the core 1 in the stacking direction (direction Z). The heat transfer plates HP and the side plates 4 are flat plate members having a flat plate shape formed in the same rectangular shape as seen in plan view. That is, the core 1 is formed in a rectangular box-like shape (rectangular parallelepiped shape) as a whole by causing a stack of the plurality of heat transfer plates HP to be interposed between a pair of the side plates 4 and integrating the heat transfer plates HP and the side plates 4 with each other through diffusion bonding. For the sake of convenience, FIG. 1 shows an example in which eight heat transfer plates HP are stacked between the pair of side plates 4. The number of the heat transfer plates HP to be stacked is not limited thereto and the number of heat transfer plates HP to be stacked may be any number.

Figure 2:
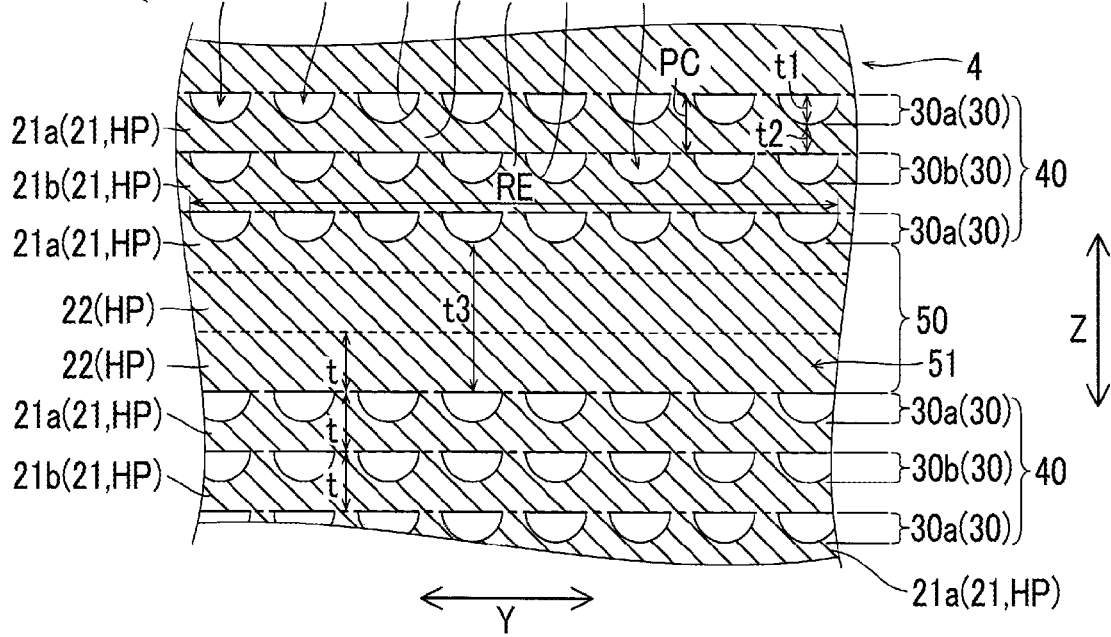
FIG. 2 is a sectional view of a core taken along line 500-500 in FIGS. 3 to 5.

In the first embodiment, as shown in FIG. 2, the heat transfer plates HP constituting the core 1 include first heat transfer plates 21 that include groove portions 23 constituting the flow paths FP and second heat transfer plates 22 that include no groove portion 23. That is, the heat transfer plates HP that have the same shape as each other and in which the groove portions 23 constituting the flow paths FP are formed are the first heat transfer plates 21 and the heat transfer plates HP that have the same shape as each other and in which the groove portions 23 constituting the flow paths FP are not formed are the second heat transfer plates 22. Note that, in the case of the core 1, since the heat transfer plates HP are integrated with each other through diffusion bonding, boundary lines between surfaces to be bonded of the heat transfer plates HP as shown in FIG. 1 are not formed in fact. For the sake of convenience, in FIG. 2, the boundary lines between the heat transfer plates HP are shown by broken lines.

As shown in FIG. 2, in the first embodiment, the core 1 includes a plurality of flow path blocks 40 each of which is configured to include a plurality of flow path layers 30 in which the flow paths FP are formed and a partition wall layer that is disposed to divide the plurality of flow path blocks 40.

Each flow path layer 30 is a region formed over an area from upper surfaces to bottom surfaces of the flow paths FP (that is, height of flow paths FP in stacking direction) in a cross-section orthogonal to the flow paths FP. The flow path layers 30 are composed of the first heat transfer plates 21 which are the heat transfer plates HP in which the groove portions 23 constituting the flow paths FP are formed by diffusion bonding.

Each flow path layer 30 has a thickness t1 that is equal to the height of the flow paths FP in the direction Z. The flow path layers 30 are provided over the entire core 1 along a plane (XY plane) orthogonal to the stacking direction. One flow path layer 30 includes the flow paths FP, of which the number coincides with the number of the groove portions 23 formed in one first heat transfer plate 21. A wall portion 24 having an interval t2 is provided between the flow path layers 30 that are adjacent to each other in the direction Z. The wall portion 24 is a solid portion of the first heat transfer plate 21 in which no groove portion 23 is formed.

The flow path layers 30 include flow path layers 30a in which the first flow paths 11 through which the high-temperature fluid HF flows are formed and flow path layers 30b in which the second flow paths 12 through which the low-temperature fluid LF flows are formed.

Each flow path block 40 is composed of a plurality of the flow path layers 30 arranged in the stacking direction. Each flow path block 40 includes at least one flow path layer 30a and at least one flow path layer 30b. Accordingly, heat exchange between the high-temperature fluid HF and the low-temperature fluid LF is performed between the flow path layers 30 included in the flow path blocks 40.

The flow path layers 30 (30a and 30b) included in one flow path block 40 are arranged at a predetermined pitch PC in the stacking direction. The pitch PC is a distance between the same portions of the flow path layers 30 adjacent to each other in the stacking direction and is, for example, a distance from an upper surface of a flow path FP (flow path layer 30) to an upper surface of another flow path FP (flow path layer 30) adjacent to the flow path FP in the stacking direction.

A plurality of the flow path blocks 40 are provided to be arranged in the direction Z in the core 1. The partition wall layer 50 divides the plurality of flow path blocks 40. That is, each flow path block 40 is a group of a plurality of the flow path layers 30 divided by the partition wall layer 50.

The partition wall layer 50 in the first embodiment is composed of the second heat transfer plates 22 which are the heat transfer plates HP in which no groove portion 23 is formed. The partition wall layer 50 is a region between the flow path layers 30 that are the outermost flow path layers from among the flow path layers 30 of the flow path blocks 40 adjacent to each other. The partition wall layer 50 is provided over the entire core 1 along the plane (XY plane) orthogonal to the stacking direction. In addition, the partition wall layer 50 may include a solid portion (that is, wall portion 24) of the first heat transfer plate 21 constituting the outermost flow path layer 30, in which no groove portion 23 is formed.

Hereinafter, the flow path blocks 40 and the partition wall layer 50 will be specifically described.
(Flow Path Layer)

As described above, the flow path layers 30 are composed of the first heat transfer plates 21. The groove portions 23 are formed on one surface (upper surface) of each first heat transfer plate 21 and the other surface (lower surface) of the first heat transfer plate 21 is a flat surface. Each groove portion 23 is formed in a predetermined shape through etching, for example. A portion of the one surface (upper surface) of each first heat transfer plate 21 excluding the groove portions 23 is a flat surface and is a surface to be bonded through diffusion bonding.

Each of the flow paths FP included in the flow path layers 30 is a hollow portion formed by the groove portion 23 (inner surface of groove portion 23) of the first heat transfer plate 21 and a surface (lower surface) on one side of another first heat transfer plate 21 that is stacked on a surface (upper surface) on the other side of the first heat transfer plate 21.

The first flow paths 11 (refer to FIG. 3) of the flow path layers 30a and the second flow paths 12 (refer to FIG. 4) of the flow path layers 30b are different from each other in shape in a plan view as seen in the direction Z. Therefore, the first heat transfer plates 21 include first heat transfer plates 21a constituting the flow path layers 30a in which the first flow paths 11 are formed and first heat transfer plates 21b constituting the flow path layers 30b in which the second flow paths 12 are formed. The first heat transfer plates 21a and the first heat transfer plates 21b are different from each other in shape of the groove portions 23.
(First Flow Path)

Figure 3:
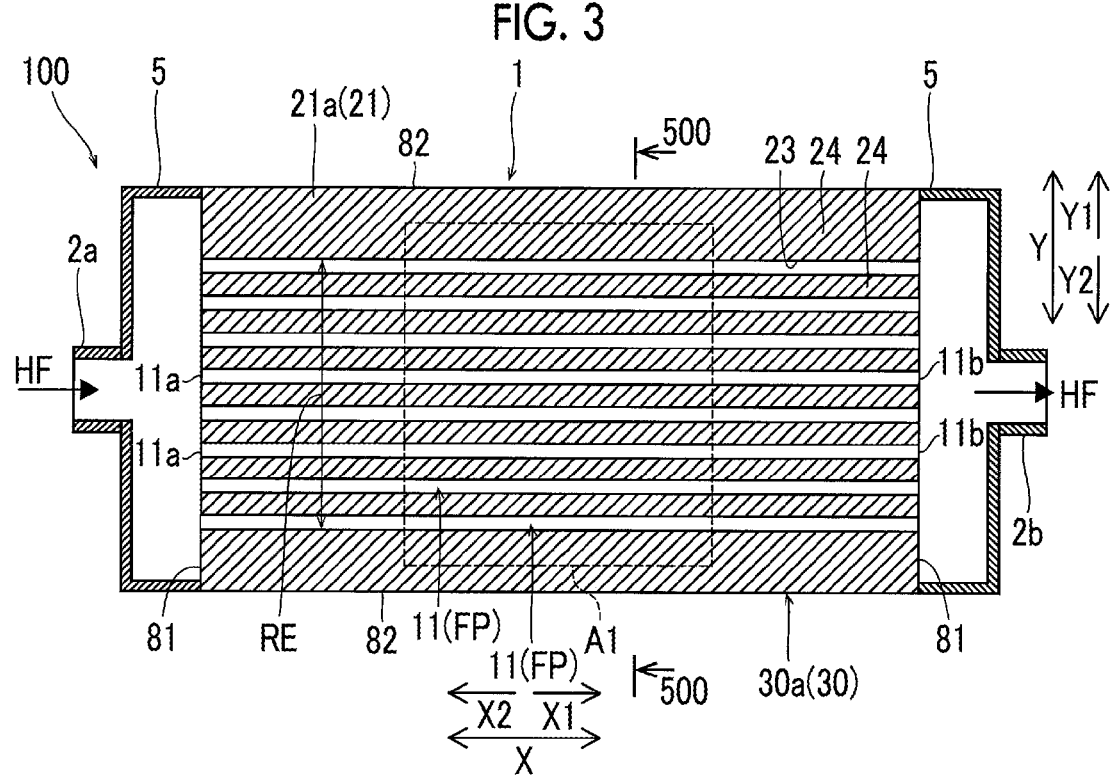
FIG. 3 is a plan view showing a configuration example of a first heat transfer plate constituting first flow paths.

As shown in FIG. 3, each first heat transfer plate 21a includes the groove portions 23 constituting the first flow paths 11 and the wall portions 24 defining the first flow paths 11. The wall portions 24 are hatched in FIG. 3 for the sake of convenience.

The first flow paths 11 (groove portions 23) are formed to be open at the pair of first side end surfaces 81 at which the first inlet 2a and the first outlet 2b are disposed. The first flow paths 11 are flow paths that linearly extend between flow path inlets 11a and flow path outlets 11b which are open at the pair of first side end surfaces 81 of the first heat transfer plate 21a respectively. That is, the first flow paths 11 linearly extend along the second side end surfaces 82 (long sides of core 1).

A pair of header portions 5 is bonded to the first side end surfaces 81 of the core 1. The pair of header portions 5 is provided to cover the flow path inlets 11a or the flow path outlets 11b of the stacked first heat transfer plates 21a. One header portion 5 is provided with the first inlet 2a, and the other header portion 5 is provided with the first outlet 2b. Accordingly, the high-temperature fluid HF flowing in through the first inlet 2a flows into the flow path inlets 11a of each of the first heat transfer plates 21a via the header portion 5, passes through the first flow paths 11 in a direction X1, flows out via the flow path outlets 11b, and is discharged from the first outlet 2b via the header portion 5. Note that, in FIG. 3, the second inlet 3a and the second outlet 3b are not shown.

A plurality of the first flow paths 11 (groove portions 23) are provided to be arranged in a flow path width direction. For the sake of convenience, FIG. 3 shows an example in which eight first flow paths 11 are arranged at equal intervals in the flow path width direction. The number of the first flow paths 11 (groove portions 23), the width of the flow paths, and the pitch of the flow paths FP are not particularly limited.

(Second Flow Path)

Figure 4:
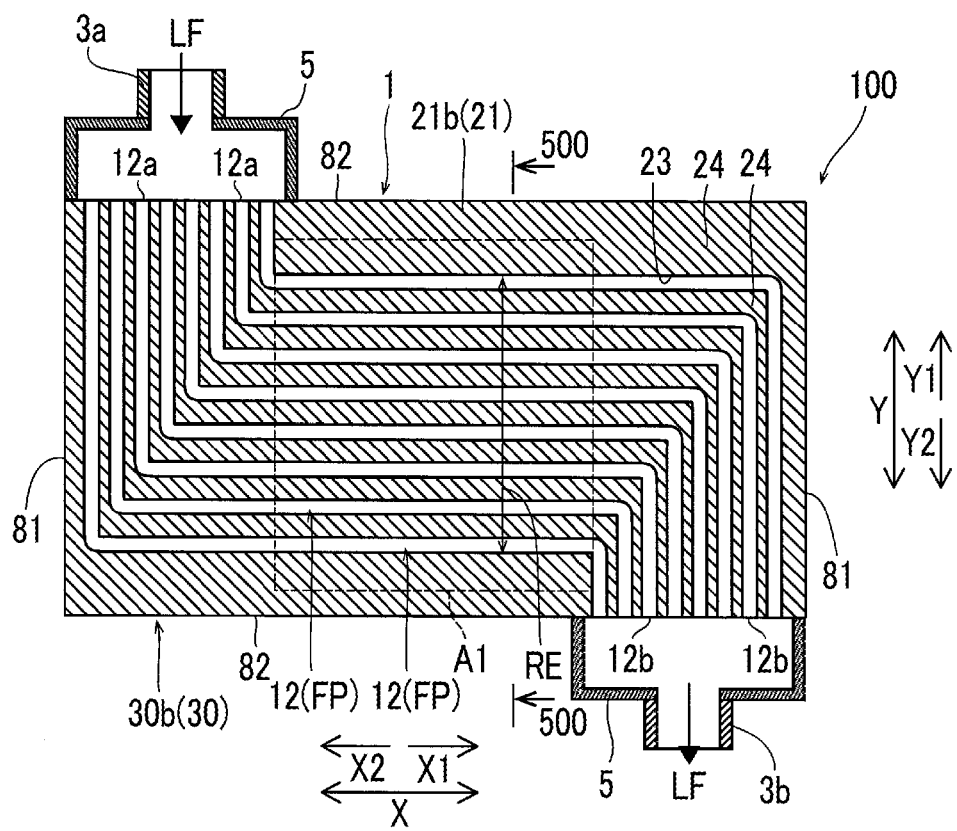
FIG. 4 is a plan view showing a configuration example of a first heat transfer plate constituting second flow paths.

As shown in FIG. 4, each first heat transfer plate 21b includes the groove portions 23 constituting the second flow paths 12 and the wall portions 24 defining the second flow paths 12.

The second flow paths 12 (groove portions 23) are bent flow paths that connect flow path inlets 12a and flow path outlets 12b which are open at the pair of second side end surfaces 82 at which the second inlet 3a and the second outlet 3b are disposed respectively. The flow path inlets 12a of the second flow paths 12 are provided at an end portion of one second side end surface 82, the end portion being on one side (direction X2 side) on which the flow path inlets 11a of the first flow paths 11 are disposed. The flow path outlets 12b of the second flow paths 12 are provided at an end portion of the other second side end surface 82, the end portion being on the other side (direction X1 side) on which the flow path outlets 11b of the first flow paths 11 are disposed.

The second flow paths 12 are bent after extending in the direction Y from the flow path inlets 12a open at the one second side end surface 82 of the first heat transfer plate 21b and extend in the direction X along the second side end surfaces 82 and the second flow paths 12 are bent after extending up to an end portion in the direction X1 and extends in the direction Y up to the flow path outlets 12b open at the other second side end surface 82.

A pair of header portions 5 is bonded to the second side end surfaces 82 of the core 1. The pair of header portions 5 is provided to cover the flow path inlets 12a or the flow path outlets 12b of the stacked first heat transfer plates 21b. One header portion 5 is provided with the second inlet 3a, and the other header portion 5 is provided with the second outlet 3b. Accordingly, the low-temperature fluid LF flowing in through the second inlet 3a flows into the flow path inlets 12a of each of the first heat transfer plates 21b via the header portion 5, passes through the second flow paths 12, flows out via the flow path outlets 12b, and is discharged from the second outlet 3b via the header portion 5. Note that, in FIG. 4, the first inlet 2a and the first outlet 2b are not shown.

A plurality of the second flow paths 12 (groove portions 23) are provided to be arranged in the flow path width direction. For the sake of convenience, FIG. 4 shows an example in which eight second flow paths 12 are arranged at equal intervals in the flow path width direction. The number of the second flow paths 12 (groove portions 23), the width of the flow paths, and the pitch of the flow paths FP are not particularly limited. For example, the number of the first flow paths 11 and the number of the second flow paths 12 are the same as each other. For example, the first flow paths 11 and the second flow paths 12 are the same as each other in flow path width and are provided at the same pitch.

(Positional Relationship Between First Flow Path and Second Flow Path)

As shown in FIG. 2, in the flow path blocks 40, the flow path layers 30a including the first flow paths 11 and the flow path layers 30b including the second flow paths 12 are alternately disposed in the stacking direction (direction Z). Each of the first flow paths 11 of the flow path layers 30a and each of the second flow paths 12 of the flow path layers 30b are disposed to be arranged in the stacking direction (direction Z). That is, positions where the groove portions are formed in the first heat transfer plates 21a and positions where the groove portions 23 are formed in the first heat transfer plates 21b coincide with each other at least in a region A1 shown in FIGS. 3 and 4. Heat exchange is performed between the high-temperature fluid HF flowing through the first flow paths 11 and the low-temperature fluid LF flowing through the second flow paths 12 via the wall portions 24 of the (minimum) intervals t2 between the flow paths.

(Partition Wall Layer)

Figure 5:
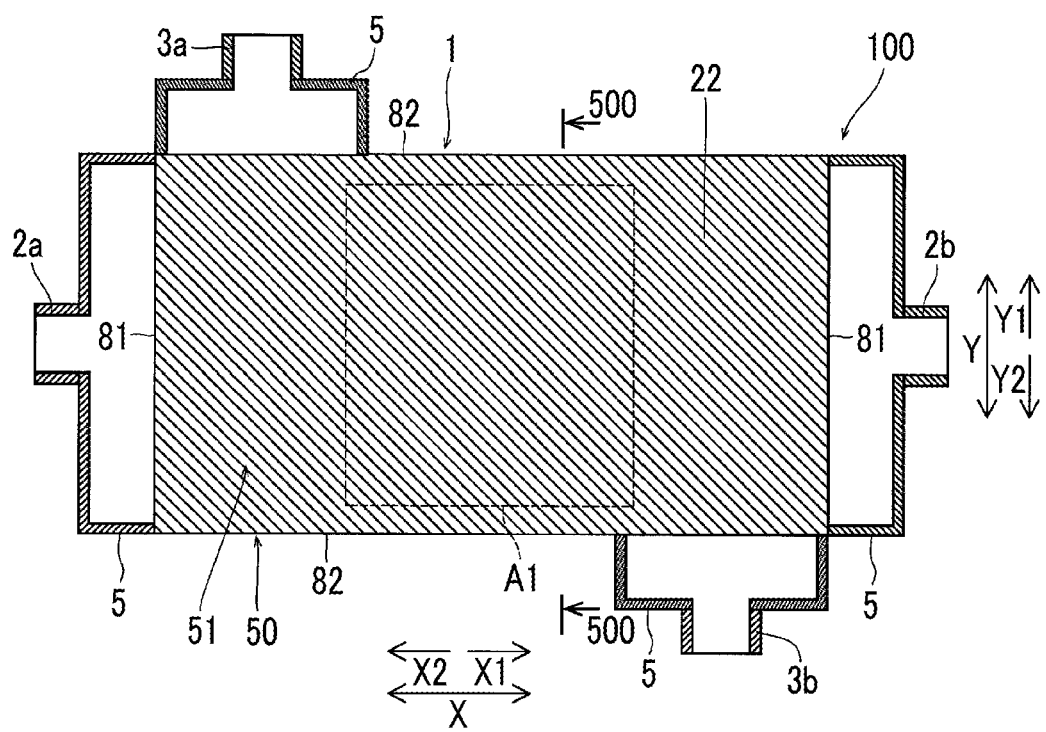
FIG. 5 is a plan view showing a configuration example of a second heat transfer plate.

No flow path is formed in the partition wall layer 50. That is, the groove portions 23 for forming flow paths are not formed in the second heat transfer plates 22 constituting the partition wall layer 50. In an example shown in FIG. 2, both of one surface (upper surface) and the other surface (lower surface) of each second heat transfer plate 22 are flat surfaces. FIG. 5 shows the planar shape of the second heat transfer plate 22 and a solid portion 51 in which no groove portion is formed is hatched. The second heat transfer plate 22 can be bonded through diffusion bonding over the entire part of the one surface (upper surface) and the other surface (lower surface). Note that, the partition wall layer 50 may include a hollow region other than the flow paths. The partition wall layer 50 may include a groove, a recess, or a through-hole formed for, for example, an alignment mark, alignment with respect to a jig, and the like.

As shown in FIG. 2, the partition wall layer 50 is provided to divide the flow path blocks 40 in the core 1. That is, the flow path blocks 40 in the core 1 are provided at one side (upper side) and the other side (lower side) in the stacking direction respectively with the partition wall layer 50 interposed therebetween. The partition wall layer 50 is a layer formed in the stacking direction over an area between the outermost (lowermost) flow path layer 30 of the flow path block 40 on the one side and the outermost (uppermost) flow path layer 30 of the flow path block 40 on the other side.

In the first embodiment, a thickness t3 of the partition wall layer 50 in the stacking direction is larger than the interval t2 between the flow paths FP arranged in the stacking direction. As shown in FIG. 2, the interval t2 between the flow paths FP arranged in the stacking direction is an interval between the lowest bottom surface (inner peripheral surface of groove portion 23) of the flow path FP and an upper surface (one surface of first heat transfer plate 21) of another flow path FP that is adjacent to the flow path FP in the direction Z. That is, in the flow path blocks 40, the wall portions 24 of which the thickness is the same as the interval t2 partition the first flow paths 11 and the second flow paths 12 arranged in the direction Z. The partition wall layer 50 divides the flow path blocks 40 with the thickness t3 thereof being larger than the thickness of each of the wall portions 24 corresponding to the intervals t2, the wall portions 24 partitioning the first flow paths 11 and the second flow paths 12.

Specifically, the partition wall layer 50 may be composed of one second heat transfer plate 22 or a plurality of stacked second heat transfer plates 22. Therefore, the partition wall layer 50 has the thickness t3 corresponding to the number of the second heat transfer plates 22 stacked in the direction Z. In the example shown in FIG. 2, the partition wall layer 50 is composed of the plurality of second heat transfer plates 22 that are stacked. In the example shown in FIG. 2, the partition wall layer 50 is composed of two second heat transfer plates 22. To be more precise, the thickness t3 of the partition wall layer 50 corresponds to the sum $\{(2 \times t) + t2\}$ of the thicknesses t of two second heat transfer plates 22 and the interval t2 between a lower surface of the first heat transfer plate 21 constituting the outermost flow path layer 30 of the flow path block 40 and the flow path FP. Therefore, in the first embodiment, the thickness t3 of the partition wall layer 50 in the stacking direction is larger than the pitch PC of the flow path layers 30 constituting the flow path block 40.

In addition, the partition wall layer 50 is mainly composed of the solid portion 51. Specifically, in a cross-section orthogonal to the flow paths FP, the proportion of the solid portion 51 in the partition wall layer 50 is larger than the proportion of the solid portion (wall portion 24) in the flow path layer 30. Here, the proportion is the proportion of the area thereof in the cross-section orthogonal to the flow paths FP. That is, in short, the proportion of a solid portion is {sectional area of solid portion of heat transfer plate HP/ (sectional area of solid portion of heat transfer plate HP+sum of sectional areas of hollow portions)}. Since the flow path layer 30 includes the flow paths FP which are hollow portions, the sum of the sectional areas of the hollow portions of the flow path layer is larger than that of the partition wall layer 50. Therefore, the proportion of the solid portion (wall portion 24) in the flow path layer 30 is smaller than that of the partition wall layer 50.

In addition, the partition wall layer 50 includes the solid portion 51 that is continuous in a direction along the flow path layers 30 in the cross-section orthogonal to the flow paths FP from one end to the other end of an area RE in which the flow paths FP of the flow path layers 30 are formed. In an example shown in FIGS. 2 to 4, since eight flow paths FP are formed in each flow path layer 30, the area RE in which the flow paths FP are formed corresponds to a distance between an outermost portion of the flow path FP on one end side from among the eight flow paths FP and an outermost portion of the flow path FP on the other end side from among the eight flow paths FP. The partition wall layer 50 includes the solid portion 51 which is continuous over the area RE between the outermost portion of the flow path FP on one end side and the outermost portion of the flow path FP on the other end side. In a configuration example shown in FIGS. 2, 5, and 6, since a hollow portion such as a groove is not formed in the partition wall layer 50 (second heat transfer plates 22), the solid portion 51 is continuous over the entire area from one end to the other end of the core 1 including the area RE in which the flow paths FP are formed.

Note that, in the first embodiment, the same flow path layers 30 from among the flow path layers 30a and the flow path layers 30b are disposed at outermost portions of the flow path blocks 40. That is, the flow path layer 30 at a lower end of the flow path block 40 that is disposed on an upper surface side of the partition wall layer 50 and the flow path layer 30 at an upper end of the flow path block 40 that is disposed on a lower surface side of the partition wall layer 50 are composed of the flow path layers 30 in which the same flow paths from among the first flow paths 11 and the second flow paths 12 are formed.

In an example shown in FIG. 2, at the outermost portions of the flow path blocks 40, the flow path layers 30 including flow paths of which a change in temperature caused by heat exchange is small from among the first flow paths 11 and the second flow paths 12 are disposed. For example, the inlet temperature of the high-temperature fluid HF (antifreeze) is approximately the same as the temperature of a usage environment and is, for example, approximately 20° C. The inlet temperature of the low-temperature fluid LF (liquefied hydrogen) is, for example, approximately −253° C. Due to heat exchange, the outlet temperature of the high-temperature fluid HF (antifreeze) is approximately −40° C. and the outlet temperature of the low-temperature fluid LF (liquefied hydrogen) is close to −40° C. Therefore, the change in temperature is smaller in the first flow paths 11 through which the high-temperature fluid HF flows and in the first embodiment, the flow path layers 30a including the first flow paths 11 are provided at the outermost portions of the flow path blocks 40. That is, in each flow path block 40, the flow path layers 30 are arranged in the order of the flow path layer 30a (outermost layer), the flow path layer 30b, the flow path layer 30a, . . . , the flow path layer 30b, and the flow path layer 30a (outermost layer). Therefore, the flow path layers 30a including the first flow paths 11 are disposed on one surface (upper surface) side and the other surface (lower surface) side of the partition wall layer 50.

Note that, the first heat transfer plates 21a and 21b constituting the flow path layers 30 and the second heat transfer plates 22 constituting the partition wall layer 50 are formed of the same material. In addition, the first heat transfer plates 21a and 21b and the second heat transfer plates 22 are integrated with each other through diffusion bonding in a state of being in direct contact with each other. Therefore, the flow path layers 30 constituting the flow path blocks 40 and the partition wall layer 50 are formed of the same material and are diffusion-bonded to each other without using a bonding material.

The number of the partition wall layers 50 is determined in accordance with the number of the flow path blocks 40 to be divided. In FIG. 2, one partition wall layer 50 divides the flow path layers 30 into two flow path blocks 40.

(Specific Configuration Example of Core)

Figure 6:
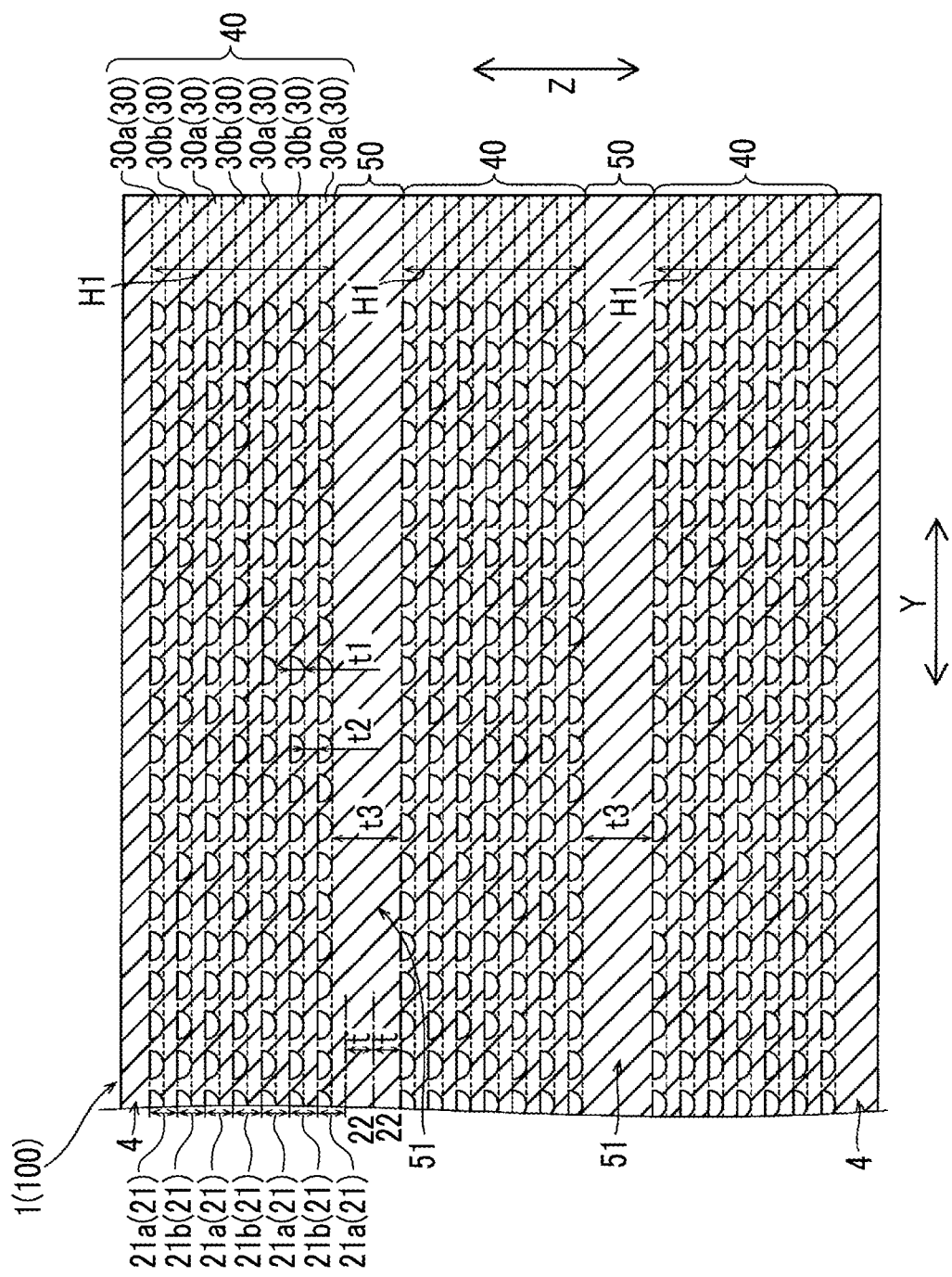
FIG. 6 is a sectional view showing a sectional configuration example of the core in which three seven-layer flow path blocks are provided.

In FIGS. 1 to 5, in order to describe a basic configuration of the core 1, the core 1 configured by stacking six flow path layers 30 to form two blocks, each of which includes three layers, with the partition wall layer 50 has been described. However, there is a case where the total number of the flow path layers 30 is made large to sufficiently ensure the area of heat transfer (surface areas of flow paths FP) in the core 1. As a specific configuration example, for example, FIG. 6 shows an example of the core 1 including twenty-one flow path layers 30 in total. In the case of the core 1 in FIG. 6, twelve flow path layers 30 (that is, first heat transfer plates 21a) including the first flow paths 11 are provided and nine flow path layers 30 (that is, first heat transfer plates 21b) including the second flow paths 12 are provided.

In the core 1 in FIG. 6, an example in which the twenty-one flow path layers 30 in total are divided into three flow path blocks 40 each of which includes seven layers is shown. Therefore, in the core 1 in FIG. 6, two partition wall layers 50 are provided to divide the three flow path blocks 40. Each flow path block 40 has a height H1 in the stacking direction. Each partition wall layer 50 is composed of two second heat transfer plates 22.

As an example of the dimensions of the core 1, a length L0 of a long side of the core 1 (refer to FIG. 1) is approximately 500 mm and a width W0 of a short side (refer to FIG. 1) is approximately 200 mm. Each of the heat transfer plates HP (first heat transfer plates 21 and second heat transfer plates 22) has a thickness t=2 mm and each of the flow path layers 30 has a thickness (height dimension of flow path FP or groove portion 23) t1=1 mm. Therefore, intervals between the flow paths FP arranged in the stacking direction are t2=1 mm and the pitch of the flow path layers 30 is PC=2 mm. The thickness t3 of each partition wall layer 50 is the sum of the thicknesses (2×t) of two second heat transfer plates 22 and the thickness (t2) of a portion of the outermost first heat transfer plate 21 excluding the flow path layer 30. Therefore, the thickness t3=5 mm. In the core 1 in FIG. 6, the height of the core 1 in the direction Z is approximately 80 mm to 100 mm. The core 1 may be composed of, for example, approximately 7 layers×15 blocks. In that case, the total number of the flow path layers 30 is 105 and the height of the core 1 in the direction Z is approximately 300 mm.

(Action of Heat Exchanger)

Figure 7:
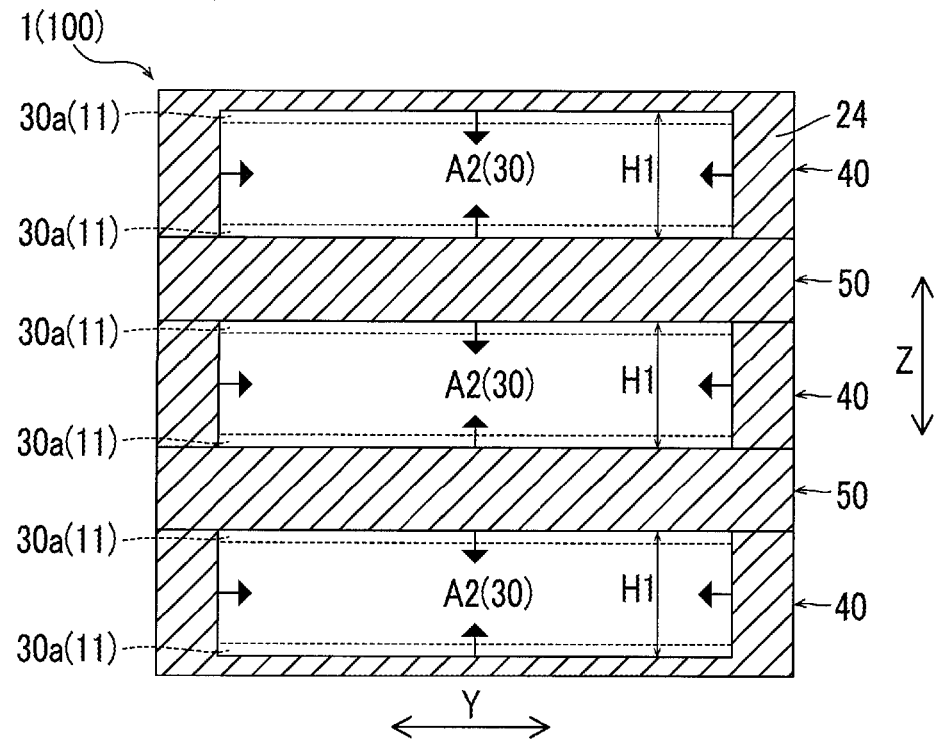
FIG. 7 is a sectional view schematically showing the structure of the core in the first embodiment.

Next, the action of the heat exchanger 100 of the first embodiment will be described. The structure of the core 1 shown in FIG. 6 can be schematically illustrated as shown in FIG. 7. FIG. 7 schematically shows the structure of the core 1 in a cross-section orthogonal to the flow paths FP. That is, the core 1 has a structure in which the plurality of flow path blocks 40 and the partition wall layers 50 dividing the flow path blocks 40 are arranged in the stacking direction. Since each flow path block 40 is composed of the plurality of flow path layers 30 including the flow paths FP, it will be assumed that the vicinity of each hollow region A2, which is composed of a group of the flow paths FP, is surrounded by the solid wall portions 24 in the structure. The entire partition wall layers 50 can be considered as the solid portions 51.

In the heat exchanger 100 that recovers cold of the low-temperature fluid LF to the high-temperature fluid HF side through heat exchange between the high-temperature fluid HF and the low-temperature fluid LF as in the first embodiment, antifreeze (brine), which is the high-temperature fluid HF, is supplied into the core 1 first and liquefied hydrogen having a very low temperature, which is the low-temperature fluid LF, is supplied thereafter. Therefore, the core 1 is rapidly cooled by the low-temperature fluid LF in a state where the temperature of the entire core 1 including the solid portions is close to the temperature of the high-temperature fluid HF.

Therefore, when the low-temperature fluid LF flows in, rapid contraction deformation occurs in each flow path block 40 due to a decrease in temperature. That is, in each flow path block 40, a tensile stress is generated such that the solid portions (wall portions 24) surrounding the flow paths FP contract toward the central hollow region A2. Meanwhile, a portion of the core 1 that corresponds to the partition wall layers 50 has a higher rigidity than the flow path blocks 40 which have hollow structures and the amount of deformation thereof is relatively smaller than that of the flow path blocks 40. Therefore, even in a case where the flow path blocks 40 are contracted and deformed above and below each partition wall layer 50, the partition wall layers 50 function as supporting structures supporting areas between both ends in the direction Y and suppress contraction deformation of the flow path blocks 40 against the tensile stress.

Furthermore, in the first embodiment, since all of the outermost layers of each flow path block 40 are composed of the flow path layers 30a including the first flow paths 11 through which the high-temperature fluid HF flows, each partition wall layer 50 is interposed between the first flow paths 11 of one flow path block 40 and the first flow paths 11 of the other flow path block 40. Therefore, even if the low-temperature fluid LF flows into the flow path blocks 40, a difference between the temperature of one side of the partition wall layer 50 and the temperature of the other side of the partition wall layer 50 becomes not large since the same high-temperature fluids HF flow thereat and thus contraction deformation is effectively suppressed at the partition wall layer 50.

As a result, it can be considered that even in a case where the core 1 is contracted and deformed due to inflow of each low-temperature fluid LF, the partition wall layers 50 act such that regions in which contraction deformation occurs are separated from each other in the core 1 and contraction deformation independently occurs in each flow path block 40 in the case of the heat exchanger 100 in the first embodiment. The amount of thermal deformation in each flow path block 40 is proportional to the number of the flow path layers 30 (height in direction Z) included in the flow path block 40. Since the partition wall layers 50 perform the division such that the number (seven) of the flow path layers 30 stacked in each flow path block 40 is smaller than the total number (twenty-one) of the flow path layers 30, the amount of thermal deformation in each flow path block 40 is suppressed.

Figure 8:
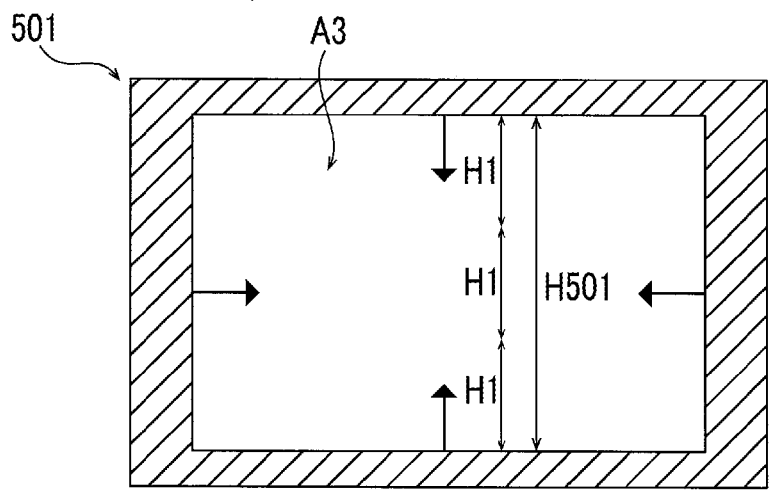
FIG. 8 is a sectional view schematically showing the structure of a core in a comparative example.

Here, for example, as a comparative example shown in FIG. 8, a configuration in which twenty-one flow path layers 30 are formed in total in a core 501 similarly to FIGS. 6 and 7 and no partition wall layer 50 is provided will be assumed. In this case, a large hollow region A3, which corresponds to an aggregate of the three flow path blocks 40 shown in FIG. 7, is formed in the core 501. In this case, when contraction deformation occurs due to inflow of the low-temperature fluid LF, large contraction deformation proportional to a height H501 corresponding to the twenty-one layers occurs.

Meanwhile, in the case of the core 1 of the first embodiment as shown in FIG. 7, only contraction deformation proportional to the height H1 corresponding to seven layers occurs in each flow path block 40 and thus a thermal stress generated between flow paths is suppressed.

Figure 9:
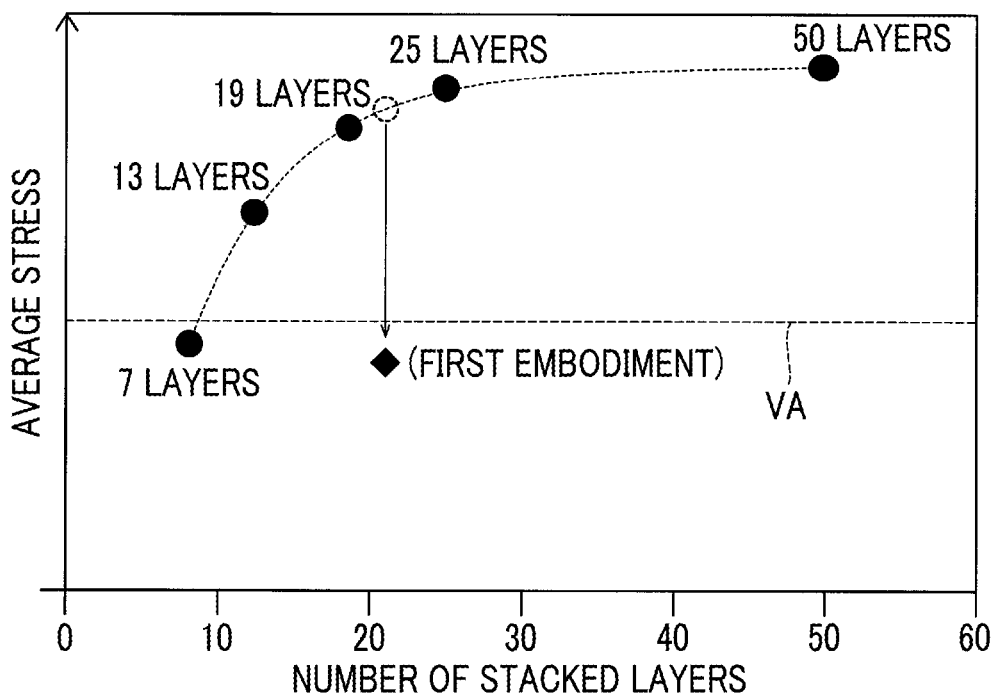
FIG. 9 is a graph for describing the relationship between the number of stacked flow path layers and an average stress.

FIG. 9 is a graph obtained by structural analysis of a change in average stress caused in accordance with the total number of the flow path layers 30 (number of stacked layers). The vertical axis of the graph represents the magnitude of average stress and the horizontal axis of the graph represents the number of stacked flow path layers. The average stress is the average value of stresses in the wall portion 24 between the flow paths FP adjacent to each other in one flow path layer 30.

As understood from FIG. 9, the average stress increases as the number of stacked flow path layers increases. The amount of increase of the average stress tends to be decreased and saturated as the number of stacked layers increases. FIG. 9 shows the results of calculation of the average stresses for a case where the number of stacked layers is seven, a case where the number of stacked layers is thirteen, a case where the number of stacked layers is nineteen, a case where the number of stacked layers is twenty-five, and a case where the number of stacked layers is fifty. However, the average stress in the case of the core 501 (comparative example) as shown in FIG. 8, in which twenty-one layers are stacked, is a value between a value related to the case where the number of stacked layers is nineteen and a value related to the case where the number of stacked layers is twenty-five (refer to broken line). Meanwhile, it can be found that the average stress in the case of the core 1 in the first embodiment as shown in FIGS. 6 and 7 is decreased to a value similar to that in the case of a core with only seven layers since the twenty-one flow path layers 30 in total are divided into seven layers×three blocks by the partition wall layers 50.

As described above, in the core 1 of the first embodiment, the magnitude of stresses in the wall portions 24 in each flow path block 40 is determined by the number of stacked flow path layers 30 that are included in each flow path block 40 in a case where it can be considered that the flow path blocks 40 divided by the partition wall layers 50 are thermally deformed independently of each other. Therefore, for example, the number of stacked flow path layers 30 that are included in each flow path block 40 is determined to be the maximum value within a range in which the average stress becomes lower than a permissible value VA which is set in design specification and the number of the partition wall layers 50 is determined based on the number of stacked flow path layers 30 determined as above and the total number of the flow path layers 30 to be provided in the core 1.

(Manufacturing Method of Heat Exchanger)

Next, with reference to FIG. 10, a manufacturing method of the heat exchanger 100 of the first embodiment will be described.

In step S1, the first heat transfer plates 21 including the groove portions 23 are formed. A plurality of the heat transfer plates HP with predetermined dimensions in which no groove portion 23 is formed are prepared and the groove portions 23 are formed in the heat transfer plates HP in accordance with a flow path shape through etching or the like, for example. Accordingly, a predetermined number of the first heat transfer plates 21a and a predetermined number of the first heat transfer plates 21b as shown in FIGS. 3 and 4 are formed. In the case of an example shown in FIG. 6, twelve first heat transfer plates 21a and nine first heat transfer plates 21b are formed.

In addition, a portion of the heat transfer plates HP is used as it is as the second heat transfer plates 22 with no groove portion 23 formed therein. In the example shown in FIG. 6, since one partition wall layer 50 is composed of two second heat transfer plates 22, four second heat transfer plates 22 are prepared in total. In addition, one pair of the side plates 4 to be provided at the outermost portions of the core 1 are prepared. The side plates 4 may also be configured by stacking a predetermined number of the heat transfer plates HP that are the same as above.

In step S2, the first heat transfer plates 21 and the second heat transfer plates 22 are stacked. For example, as shown in FIG. 6, the members are stacked in the order of the side plate 4, the first heat transfer plates 21a and 21b constituting the flow path block 40, the second heat transfer plates 22 constituting the partition wall layer 50, the first heat transfer plates 21a and 21b constituting the flow path block 40, the second heat transfer plates 22 constituting the partition wall layer 50, the first heat transfer plates 21a and 21b constituting the flow path block 40, and the side plate 4 starting from a lower side in the stacking direction.

In step S3, diffusion bonding is performed on a stack of the members formed in step S2. The diffusion bonding is performed by heating the stack and pressing (compressing) the stack in the stacking direction in an atmosphere such as a vacuum atmosphere or an inert gas atmosphere. Accordingly, the members are integrally bonded to each other due to diffusion of atoms generated at surfaces to be bonded of the members. As a result, the core 1 in which the plurality of flow path blocks 40 are divided by the partition wall layers 50 is formed.

In the first embodiment, the partition wall layers 50 are configured as a portion of the core 1 by means of the second heat transfer plates 22 and are integrated together with other flow path layers 30 in the same step through diffusion bonding. Therefore, for example, the number of steps is reduced in comparison with a case where three cores each of which includes one flow path block 40 are formed and a member corresponding to the partition wall layer 50 is bonded between the cores. In addition, the partition wall layers 50 and the flow path blocks 40 are firmly bonded to each other (integrated with each other) through diffusion bonding.

Figure 10:
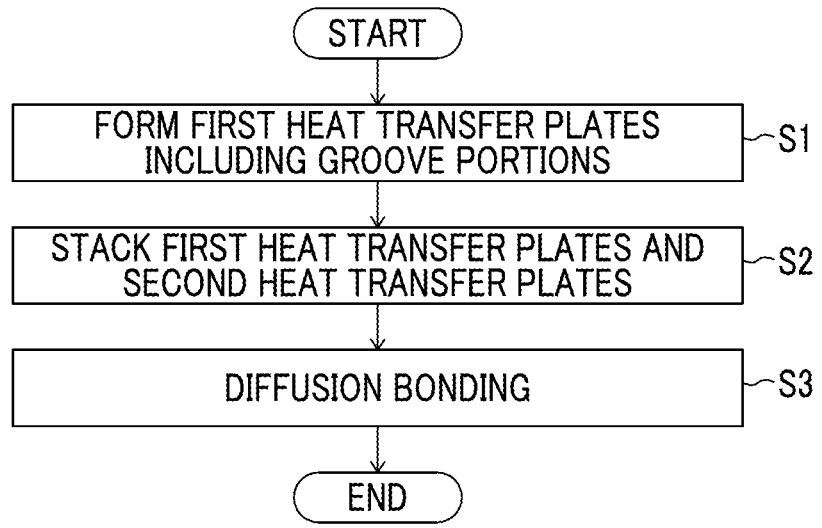
FIG. 10 is a flow chart for describing a manufacturing method of the heat exchanger of the first embodiment.

Although not shown in FIG. 10, when the core 1 is formed, the header portions 5 shown in FIG. 1 are bonded to end surfaces of the core 1 respectively and openings of the first flow paths 11 and the second flow paths 12 which are exposed at the end surfaces of the core 1 are covered. The header portions 5 are bonded to the core 1 through welding, for example. Accordingly, the first flow paths 11 included in each flow path block 40 are connected to the first inlet 2a and the first outlet 2b through the pair of header portions 5. The second flow paths 12 included in each flow path block 40 are connected to the second inlet 3a and the second outlet 3b through the pair of header portions 5.

As described above, the heat exchanger 100 in the first embodiment is manufactured.

Effect of First Embodiment

According to the first embodiment, the following effects can be achieved.

In the first embodiment, as described above, the partition wall layers 50 are disposed to divide the plurality of flow path blocks 40 each of which is configured to include the plurality of flow path layers 30. Therefore, even in a case where the total number of the flow path layers 30 is increased with an increase in number of stacked heat transfer plates HP to ensure the area of heat transfer, the flow path layers 30 can be divided by the partition wall layers 50 into the plurality of flow path blocks 40 with a smaller number of stacked layers. In addition, since each partition wall layer 50 has the thickness t3 that is larger than the interval t2 between the flow paths FP arranged in the stacking direction, the partition wall layer 50 can ensure a high rigidity in comparison with a case where the flow path layers 30 are simply stacked. Therefore, in the partition wall layers 50, thermal deformation (thermal expansion or thermal contraction) caused by a temperature difference between fluids can be made smaller than that of the flow path layers 30. As a result, in the entire core 1, the partition wall layers 50 between the flow path blocks 40 function as supporting structures suppressing deformation of the flow path blocks 40 and thus even when each of the plurality of the flow path blocks 40 arranged in the stacking direction is thermally deformed, the influence of the thermal deformation on adjacent flow path blocks 40 can be suppressed. Since the magnitude of thermal deformation is proportional to the length of a deformed portion, the amount of thermal deformation in each of the flow path blocks 40 divided by the partition wall layers 50 such that the number of stacked layers in each flow path block 40 is smaller than the total number of the flow path layers 30 can be reduced and thus it is possible to achieve a decrease in thermal stress corresponding thereto. As a result, even when the number of stacked heat transfer plates HP is increased, a thermal stress generated due to heat exchange between fluids significantly different from each other in temperature can be reduced.

In addition, in a cross-section orthogonal to the flow paths FP, the proportion of the solid portion 51 in each partition wall layer 50 is larger than the proportion of the solid portion (wall portion 24) in each flow path layer 30. Therefore, it is possible to make the rigidity of the partition wall layers 50 higher than that of each of the flow path layers 30 constituting the flow path blocks 40 easily. As a result, thermal deformation between the flow path blocks 40 can be effectively suppressed.

In addition, each partition wall layer 50 includes the solid portion 51 that is continuous in a direction along the flow path layers 30 in the cross-section orthogonal to the flow paths FP from one end to the other end of an area in which the flow paths FP of the flow path layers 30 are formed. Therefore, by using the solid portion 51 of the partition wall layer 50, it is possible to form a supporting structure that supports the area, in which the flow paths FP are formed, from the one end to the other end thereof in a region of the partition wall layer 50 between the flow path blocks 40. For example, in a case where a very low-temperature fluid flows through the flow paths FP in the flow path blocks 40 and the flow path blocks 40 are contracted and deformed, in the partition wall layer 50, it is possible to provide a support against contraction deformation in a direction along the flow path layers 30 with the solid portion 51. Accordingly, the amount of thermal deformation of the flow path blocks 40 can be reduced and the thermal stress can be effectively reduced.

In addition, the flow path layers 30 are composed of the first heat transfer plates 21 which are the heat transfer plates HP in which the groove portions 23 constituting the flow paths FP are formed by diffusion bonding and the partition wall layers 50 are composed of the second heat transfer plates 22 which are the heat transfer plates HP in which no groove portion 23 is formed. Therefore, the flow path layers 30 and the partition wall layers 50 can be formed by using the heat transfer plates HP (plate members) having the same specifications. Therefore, it is possible to reduce the number of the types of components constituting the core 1 in comparison with a case where the first heat transfer plates 21 and the second heat transfer plates 22 are formed by using the heat transfer plates HP (plate members) having different specifications from each other and thus it is possible to easily manufacture the heat exchanger 100 even in a case where the partition wall layers 50 are to be provided in the core 1.

In addition, each partition wall layer 50 is composed of the plurality of stacked second heat transfer plates 22. Therefore, even in a case where the first heat transfer plates 21 and the second heat transfer plates 22 are formed by using the heat transfer plates HP (plate members) having the same specifications, it is possible to ensure the thickness t3 of the partition wall layer 50 by stacking the second heat transfer plates 22. In addition, the thickness t3 of the partition wall layer 50 can be easily adjusted by means of the number of stacked second heat transfer plates 22.

In addition, the thickness t3 of each partition wall layer 50 in the stacking direction is larger than the pitch PC of the flow path layers 30 constituting the flow path blocks 40. Therefore, it is possible to ensure the rigidity of the partition wall layer 50 and to effectively suppress thermal deformation (thermal expansion or thermal contraction) of the flow path blocks 40 and a thermal stress caused by the thermal deformation.

In addition, the flow path layers 30 constituting the flow path blocks 40 and the partition wall layers 50 are formed of the same material and are diffusion-bonded to each other without using a bonding material. Therefore, the linear expansion coefficients of the flow path layers 30 and the partition wall layers 50 formed of the same material coincide with each other and thus generation of a stress caused by a difference between the amounts of thermal deformation at a joint portion can be reduced. In addition, in the diffusion bonding, materials on surfaces to be bonded are integrated with each other in units of atoms. Therefore, the flow path layers 30 and the partition wall layers 50 can be firmly bonded to each other in comparison with a case where the flow path layers 30 and the partition wall layers 50 are bonded to each other with a bonding material such as solder interposed therebetween. As a result, it is possible to prevent fatigue fracture or the like of the joint portion caused by thermal deformation. In addition, if the layers (flow path layers 30 and partition wall layers 50) constituting the flow path blocks 40 are bonded to each other by using a bonding material such as solder, defects in solder-joint portions between the layers are generated due to the influence of heat at a time when the header portions 5 are welded to the side surfaces of the core 1 and thus leakage of fluids (high-temperature fluid HF and low-temperature fluid LF) becomes likely to occur between the flow path blocks 40. However, according to the above-described configuration of the present embodiment, the layers constituting the flow path blocks 40 are more firmly bonded to each other. Therefore, such a defect is less likely to occur even if there is an influence of heat when the header portions 5 are welded and thus leakage of the fluids between the flow path blocks 40 can be suppressed.

Second Embodiment

Next, with reference to FIG. 11, a second embodiment will be described. In this second embodiment, an example, in which the partition wall layers 50 are composed of third heat transfer plates 25 in which the groove portions 23 are formed unlike the first embodiment in which the partition wall layers 50 are composed of the second heat transfer plates 22 which are the heat transfer plates HP in which no groove portion 23 is formed, will be described. Note that, in the second embodiment, the same components as those in the first embodiment will be given the same reference numerals and the description thereof will be omitted.

Figure 11:
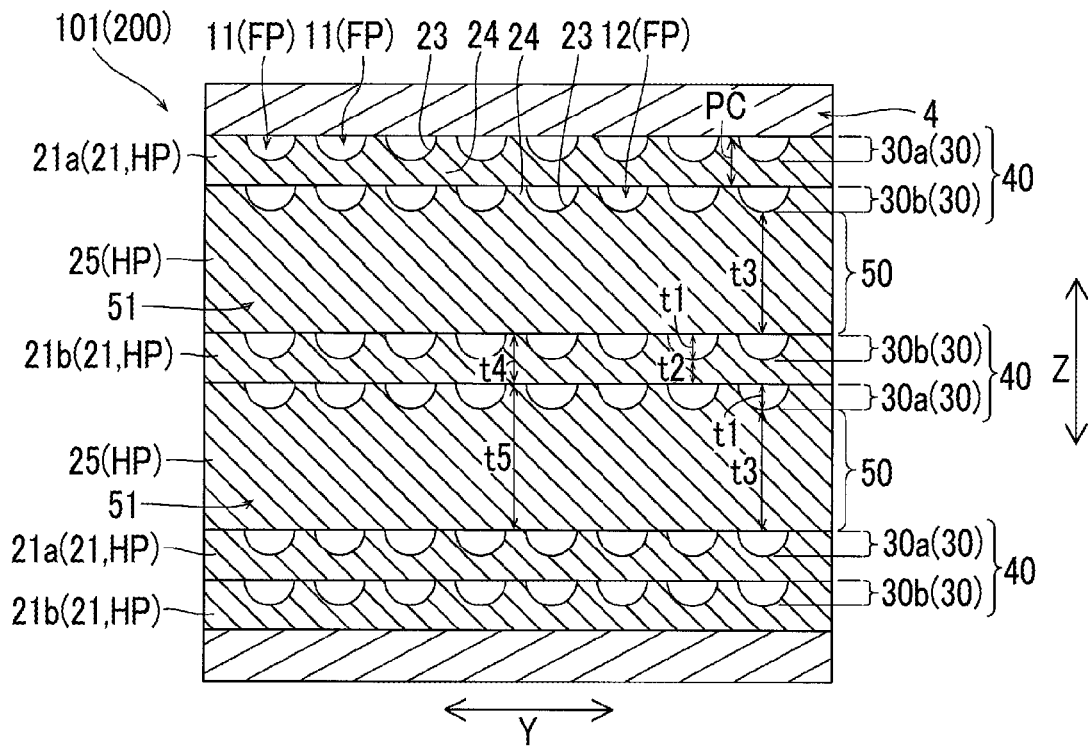
FIG. 11 is a schematic sectional view showing a core of a heat exchanger according to a second embodiment.

As shown in FIG. 11, in a core 101 of the heat exchanger 200 in the second embodiment, the flow path layers 30 are composed of the first heat transfer plates 21 in which the groove portions 23 constituting the flow paths FP are formed by diffusion bonding and the third heat transfer plates 25 in which the groove portions 23 are formed and that are larger than the first heat transfer plates 21 in thickness and the partition wall layers 50 are composed of portions of the third heat transfer plates 25 excluding the groove portions 23. Note that, for the sake of convenience, boundary surfaces between the heat transfer plates HP constituting the core 101 are shown by solid lines in FIG. 11.

The configurations of the first heat transfer plates 21 constituting the flow path layers 30 are the same as those in the first embodiment. The first heat transfer plates 21 include the first heat transfer plates 21a constituting the flow path layers 30a in which the first flow paths 11 are formed and the first heat transfer plates 21b constituting the flow path layers 30b in which the second flow paths 12 are formed. In the second embodiment, the thickness of each first heat transfer plate 21 is t4 (t4=t1+t2).

Unlike the second heat transfer plates 22 in the first embodiment, the third heat transfer plates 25 constituting the partition wall layers 50 constitute the partition wall layers 50 and constitute the outermost (lowermost) flow path layers 30 included in the flow path blocks 40.

The groove portions 23 are formed on one surface (upper surface) of each third heat transfer plate 25 and the other surface (lower surface) of the third heat transfer plate 25 is a flat surface. The third heat transfer plates 25 include the groove portions 23 constituting the first flow paths 11 or the second flow paths 12 and the wall portions 24 defining flow paths.

In a case where the flow path layers 30a including the first flow paths 11 are disposed at the outermost portions of the flow path blocks 40, the groove portions 23 constituting the first flow paths 11 are formed in the third heat transfer plates 25. In a case where the flow path layers 30b including the second flow paths 12 are disposed at the outermost portions of the flow path blocks 40, the groove portions 23 constituting the second flow paths 12 are formed in the third heat transfer plates 25.

A thickness t5 of each third heat transfer plate 25 is larger than the thickness t4 of each first heat transfer plate 21. The thickness t5 of each third heat transfer plate 25 corresponds to the sum of the thickness t1 of each flow path layer 30 and the thickness t3 of each partition wall layer 50. Each partition wall layer 50 has the thickness t3 that is larger than the interval t2 between the flow paths FP arranged in the stacking direction. The thickness t3 of each partition wall layer 50 is larger than the pitch PC of the flow path layers 30 constituting the flow path blocks 40. A portion of each third heat transfer plate 25 that corresponds to the thickness t3 is composed of the solid portion 51.

In the second embodiment, the heat transfer plates HP for forming the first heat transfer plates 21, each of which has the thickness t4, and the heat transfer plates HP for forming the third heat transfer plates 25, each of which has the thickness t5, are prepared separately. The groove portions 23 matching a flow path shape are formed in each heat transfer plate HP through etching or the like. Then, the first heat transfer plates 21 and the third heat transfer plates 25 are stacked in a predetermined order as shown in FIG. 11 and diffusion bonding is performed on the formed stack. Accordingly, the first heat transfer plates 21 and the third heat transfer plates 25 are integrated with each other to form the core 101 in which the plurality of flow path blocks 40 are divided by the partition wall layers 50.

The other configurations in the second embodiment are the same as those in the first embodiment.

Effect of Second Embodiment

In the second embodiment as well, as in the first embodiment, the partition wall layers 50 are disposed to divide the plurality of flow path blocks 40 each of which is configured to include the plurality of flow path layers 30 and each partition wall layer 50 has the thickness t3 that is larger than the interval t2 between the flow paths FP arranged in the stacking direction. Therefore, even in a case where the number of stacked heat transfer plates HP is made large, a thermal stress generated due to heat exchange between fluids significantly different from each other in temperature can be reduced.

In addition, in the second embodiment, the flow path layers 30 are composed of the first heat transfer plates 21 and the third heat transfer plates 25 and the partition wall layers 50 are composed of the portions of the third heat transfer plates 25 excluding the groove portions 23. Therefore, it is possible to collectively configure the flow path layers 30 that are disposed at outermost portions in the stacking direction from among the flow path layers 30 constituting the flow path blocks 40 and the partition wall layers 50 adjacent to the flow path layers 30 by means of the third heat transfer plates 25.

The other effects of the second embodiment are the same as those of the first embodiment.

Modification Example

Note that, the embodiments disclosed herein are merely illustrative in all aspects and should not be recognized as being restrictive. The scope of the present invention is defined by the scope of the claims instead of the description in the embodiments, and is intended to include meaning equivalent to the scope of the claims and all modifications (modification examples) within the scope.

For example, in the first and second embodiments, an example in which the inlet temperature of the high-temperature fluid HF is approximately the same as an environmental temperature (approximately 20° C.) and the inlet temperature of the low-temperature fluid LF is −253° C., which is a very low temperature, has been described. However, the present invention is not limited thereto. For example, the high-temperature fluid HF may have a very high temperature with the low-temperature fluid LF having a temperature close to the environmental temperature and the high-temperature fluid HF may have a very high temperature with the low-temperature fluid LF having a very low temperature. The present invention is particularly effective in a case where a difference between fluid temperatures is large since a thermal stress due to a difference between fluid temperatures can be reduced.

In addition, in the first and second embodiments, an example in which the flow path layers 30a including the first flow paths 11 and the flow path layers 30b including the second flow paths 12 are alternately stacked has been described. However, the present invention is not limited thereto. In the present invention, the flow path layers 30a and the flow path layers 30b may not be alternately stacked. For example, two (plurality of) flow path layers 30b may be stacked with respect to one flow path layer 30a such that the flow path layers are stacked in the order of the flow path layer 30a, the flow path layer 30b, the flow path layer 30a, the flow path layer 30a, the flow path layer 30b, . . . , and so forth along the direction Z. On the contrary, one flow path layer 30a may be stacked with respect to two (plurality of) flow path layers 30b.

In addition, in the first and second embodiments, an example in which the flow path layers 30a through which the high-temperature fluid HF flows and the flow path layers 30b through which the low-temperature fluid LF flows are provided in the core 1 has been described. However, the present invention is not limited thereto. In the present invention, three or more types of flow path layers 30 may be provided so that three or more types of fluids flow therethrough.

In addition, in FIGS. 3 and 4, examples of the planar shapes of the flow paths FP (first flow paths 11 and second flow paths 12) are shown. However, the present invention is not limited thereto. In the present invention, the planar shapes of the flow paths FP (first flow paths 11 and second flow paths 12) are not limited to the shapes shown in the drawings and may be any shape.

For example, the present invention is not limited to a case where the flow paths FP (first flow paths 11 and second flow paths 12) are provided over the approximately entire area of each heat transfer plate HP as shown in FIGS. 3 and 4 and the flow paths FP (first flow paths 11 and second flow paths 12) may be provided over only a portion (for example, half) of each heat transfer plate HP.

Figure 12:
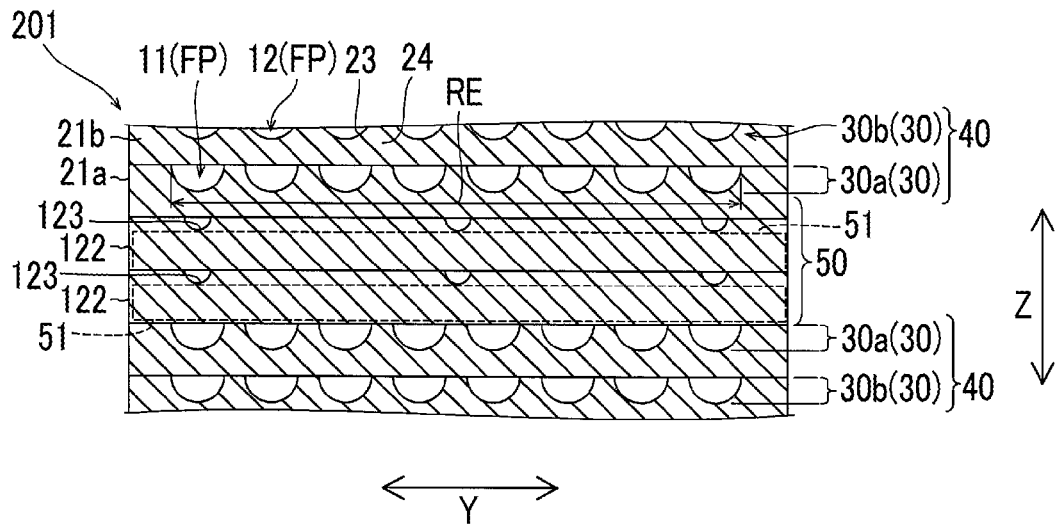
FIG. 12 is a sectional view of a core according to a modification example.

In addition, in the first and second embodiments, an example in which the entire partition wall layers 50 each having the thickness t3 are composed of the solid portions 51 has been described. However, the present invention is not limited thereto. As in a modification example shown in FIG. 12, the partition wall layers 50 may include hollow portions. In a core 201 shown in FIG. 12, the partition wall layers 50 are composed of second heat transfer plates 122. A groove portion 123 is formed on one surface of each second heat transfer plate 122. As a result of diffusion bonding of the heat transfer plates, hollow portions formed by the groove portions 123 are formed in the partition wall layers 50. The groove portions 123 are, for example, grooves for positional alignment. In FIG. 12 as well, the partition wall layers 50 may include the solid portions 51 that are continuous from one end to the other end of the area RE in which the flow paths FP are formed.

In addition, in the first and second embodiments, an example in which the partition wall layers 50 include the solid portions 51 that are continuous from the one end to the other end of the area RE in which the flow paths FP are formed has been described. However, the present invention is not limited thereto. In the present invention, the solid portions 51 may not be continuous from the one end to the other end of the area RE.

Specifically, in the first and second embodiments, an example in which, in a cross-section orthogonal to the flow paths FP, the proportion of the solid portions 51 in the partition wall layers 50 is larger than the proportion of the solid portions (wall portions 24) in the flow path layers 30 has been described. However, the present invention is not limited thereto. In the present invention, the proportion of the solid portions in the partition wall layers 50 and the proportion of the solid portions in the flow path layers 30 may be the same as each other.

In addition, in the first and second embodiments, an example in which the flow path layers 30 are composed of the first heat transfer plates 21 and the partition wall layers are composed of the second heat transfer plates 22 (and portions of outermost first heat transfer plates 21) has been described. However, the present invention is not limited thereto. In the present invention, the partition wall layers may be composed of the first heat transfer plates 21 instead of the second heat transfer plates 22. In this case, both of the flow path blocks 40 and the partition wall layers 50 of the core 1 may be composed of the first heat transfer plates 21. In this case, inlets and outlets of hollow portions formed by the groove portions 23 in the partition wall layers 50 may be closed such that the high-temperature fluid HF and the low-temperature fluid LF do not flow thereinto.

In addition, in the first embodiment, an example in which each partition wall layer 50 is composed of the plurality of (two) stacked second heat transfer plates 22 has been described. However, the present invention is not limited thereto. In the present invention, each partition wall layer may be composed of one or three or more second heat transfer plates 22.

In addition, in the first and second embodiments, an example in which the thickness t3 of each partition wall layer 50 is larger than the pitch PC of the flow path layers 30 constituting the flow path blocks 40 has been described. However, the present invention is not limited thereto. The thickness t3 of each partition wall layer 50 may be equal to or smaller than the pitch PC of the flow path layers 30.

In addition, in the first and second embodiments, an example in which the flow path layers 30 (30a and 30b) included in the flow path blocks 40 are arranged in the stacking direction at the predetermined pitch PC has been described. However, the present invention is not limited thereto. The pitch PC of the flow path layers 30 may not be constant. For example, the first heat transfer plates 21a and the first heat transfer plates 21b may be different from each other in thickness t, and in this case, the pitch PC of the flow path layers 30 is not constant. Similarly, the (minimum) interval t2 between flow paths may not be constant. That is, the interval t2 is not constant in a case where a plurality of types of heat transfer plates HP that are different from each other in thickness are used and a case where a plurality of types of heat transfer plates HP that are different from each other in depth t1 of the groove portions 23 are used.

In addition, in the first embodiment, an example in which the first inlet 2a and the first outlet 2b with respect to the first flow paths 11 are provided at the inlet side and the outlet side while forming a pair and the second inlet 3a and the second outlet 3b with respect to the second flow paths 12 are provided at the inlet side and the outlet side while forming a pair has been described. However, the present invention is not limited thereto. An inlet and an outlet for fluids with respect to the flow paths may not be provided to form a one-to-one pair. For example, a configuration in which one inlet (2a or 3a) is provided and a plurality of outlets (2b or 3b) are provided may be adopted and a configuration in which a plurality of inlets (2a or 3a) are provided and one outlet (2b or 3b) is provided may also be adopted. A configuration in which a plurality of inlets (2a or 3a) and a plurality of outlets (2b or 3b) are provided may also be adopted and in this case, the number of the inlets and the number of the outlets may be the same as each other and may be different from each other. The same applies to the header portions 5 in which an inlet or an outlet is formed and the number of the header portions 5 provided on an inlet side and the number of the header portions 5 provide on an outlet side may be different from each other. The number of the header portions 5 on the inlet side and the number of the header portions 5 on the outlet side may be one or more, respectively.

In addition, in the first embodiment, an example in which the flow path layers 30 and the partition wall layers are formed of the same material has been described. However, the flow path layers 30 and the partition wall layers 50 may be formed of different types of materials as long as the flow path layers 30 and the partition wall layers 50 can be diffusion-bonded to each other. As described above, the heat transfer plates HP may be formed of metal other than stainless steel such as aluminum-based metal and copper-based metal instead of stainless steel. In addition, even in a case where stainless steel is used, a plurality of types of stainless steel containing different components (compositions) may also be used such that the first heat transfer plates 21 are formed of SUS316 and the second heat transfer plates 22 are formed of SUS304, for example. The same applies to the first heat transfer plates 21a and the first heat transfer plates 21b constituting the flow path layers 30 and the first heat transfer plates 21a and the first heat transfer plates 21b may be formed of different types of materials from each other and may be formed of materials that are classified as the same types of materials but contain different components (compositions).

REFERENCE SIGNS LIST 1, 101, 201 core
11 first flow path (flow path)
12 second flow path (flow path)
(21a, 21b) first heat transfer plate
22, 122 second heat transfer plate
23, 123 groove portion
25 third heat transfer plate
30 (30a, 30b) flow path layer
40 flow path block
50 partition wall layer
51 solid portion
100, 200 heat exchanger
FP flow path
HF high-temperature fluid
HP heat transfer plate
LF low-temperature fluid
RE area where flow paths are formed
t2 interval between flow paths
t3 thickness of partition wall layer

The invention claimed is:

1. A diffusion bonding heat exchanger comprising:
a core in which a plurality of heat transfer plates are stacked and diffusion-bonded to each other, wherein
the core includes a plurality of flow path blocks each of which is configured to include a plurality of flow path layers in which flow paths are formed and a partition wall layer that is disposed to divide the plurality of flow path blocks,
a thickness of the partition wall layer in a stacking direction is larger than a pitch of the flow path layers constituting the flow path blocks, and
the pitch of the flow path layers is a distance from an upper surface of a flow path layer to an upper surface of next flow path layer separated from the flow path in the stacking direction, the flow path layer being one of the flow path layers.

2. The diffusion bonding heat exchanger according to claim 1,
wherein, in a cross-section orthogonal to the flow paths, a proportion of a solid portion in the partition wall layer is larger than a proportion of a solid portion in the flow path layer.

3. The diffusion bonding heat exchanger according to claim 1,
wherein the partition wall layer includes a solid portion that is continuous in a direction along the flow path layers in a cross-section orthogonal to the flow paths from one end to the other end of an area in which the flow paths of the flow path layers are formed.

4. The diffusion bonding heat exchanger according to claim 1,
wherein the flow path layers are composed of first heat transfer plates which are the heat transfer plates in which groove portions constituting the flow paths by diffusion bonding are formed, and
the partition wall layer is composed of a second heat transfer plate which is the heat transfer plate in which no groove portion is formed.

5. The diffusion bonding heat exchanger according to claim 4,
wherein the partition wall layer is composed of a plurality of the second heat transfer plates that are stacked.

6. The diffusion bonding heat exchanger according to claim 1,
wherein the flow path layers are composed of a first heat transfer plate in which groove portions constituting the flow paths are formed by diffusion bonding and a third heat transfer plate in which the groove portions are formed and that has a larger thickness than the first heat transfer plate, and
the partition wall layer is composed of a portion of the third heat transfer plate excluding the groove portions.

7. The diffusion bonding heat exchanger according to claim 1,
wherein the flow path layers constituting the flow path blocks and the partition wall layer are formed of the same material and are diffusion-bonded to each other without using a bonding material.

8. A diffusion bonding heat exchanger comprising:
a core in which a plurality of heat transfer plates are stacked and diffusion-bonded to each other, wherein
the core includes a plurality of flow path blocks and a partition wall layer that is disposed to divide the plurality of flow path blocks,
the plurality of flow path blocks are configured to include a plurality of flow path layers in each of which a flow path is formed, and a first solid portion in which the flow path is not formed, and
the first solid portion is provided adjacent to a flow path layer in the stacking direction, the flow path layer being one of the plurality of flow path layers,
a thickness of the partition wall layer in a stacking direction is larger than a pitch of the flow path layers constituting the flow path blocks, and
the flow path layers and the partition wall layer in which no flow path is formed are formed of the same material.

9. The diffusion bonding heat exchanger according to claim 8,
wherein, in a cross-section orthogonal to the flow paths, a proportion of a second solid portion in the partition wall layer is larger than a proportion of the first solid portion in the flow path layer.

10. The diffusion bonding heat exchanger according to claim 8,
wherein the partition wall layer includes a second solid portion that is continuous in a direction along the flow path layers in a cross-section orthogonal to the flow paths from one end to the other end of an area in which the flow paths of the flow path layers are formed.

11. The diffusion bonding heat exchanger according to claim 8,
wherein the flow path layers are composed of first heat transfer plates which are the heat transfer plates in which groove portions constituting the flow paths by diffusion bonding are formed, and
the partition wall layer is composed of a second heat transfer plate which is the heat transfer plate in which no groove portion is formed.

12. The diffusion bonding heat exchanger according to claim 11,
   wherein the partition wall layer is composed of a plurality of the second heat transfer plates that are stacked.

13. The diffusion bonding heat exchanger according to claim 8,
   wherein the flow path layers are composed of a first heat transfer plate in which groove portions constituting the flow paths are formed by diffusion bonding and a third heat transfer plate in which the groove portions are formed and that has a larger thickness than the first heat transfer plate, and
   the partition wall layer is composed of a portion of the third heat transfer plate excluding the groove portions.

14. A diffusion bonding heat exchanger comprising:
   a core in which a plurality of heat transfer plates are stacked and diffusion-bonded to each other, wherein
   the core includes a plurality of flow path blocks and a partition wall layer that is disposed to divide the plurality of flow path blocks,
   the plurality of flow path blocks are configured to include a plurality of flow path layers in each of which a flow path is formed, and a first solid portion in which the flow path is not formed, and
   the first solid portion is provided adjacent to a flow path layer in the stacking direction, the flow path layer being one of the plurality of flow path layers,
   a thickness of the partition wall layer in a stacking direction is larger than a pitch of the flow path layers constituting the flow path blocks, and
   the flow path layers and the partition wall layer in which no flow path is formed are formed of the same material and are bonded to each other without interposing a bonding material therebetween.

15. The diffusion bonding heat exchanger according to claim 14,
   wherein, in a cross-section orthogonal to the flow paths, a proportion of a second solid portion in the partition wall layer is larger than a proportion of the first solid portion in the flow path layer.

16. The diffusion bonding heat exchanger according to claim 14,
   wherein the partition wall layer includes a solid portion that is continuous in a direction along the flow path layers in a cross-section orthogonal to the flow paths from one end to the other end of an area in which the flow paths of the flow path layers are formed.

17. The diffusion bonding heat exchanger according to claim 14,
   wherein the flow path layers are composed of first heat transfer plates which are the heat transfer plates in which groove portions constituting the flow paths by diffusion bonding are formed, and
   the partition wall layer is composed of a second heat transfer plate which is the heat transfer plate in which no groove portion is formed.

18. The diffusion bonding heat exchanger according to claim 17,
   wherein the partition wall layer is composed of a plurality of the second heat transfer plates that are stacked.

19. The diffusion bonding heat exchanger according to claim 14,
   wherein the flow path layers are composed of a first heat transfer plate in which groove portions constituting the flow paths are formed by diffusion bonding and a third heat transfer plate in which the groove portions are formed and that has a larger thickness than the first heat transfer plate, and
   the partition wall layer is composed of a portion of the third heat transfer plate excluding the groove portions.

* * * * *